United States Patent
Erben

(10) Patent No.: US 6,576,836 B2
(45) Date of Patent: Jun. 10, 2003

(54) INDICATING INSTRUMENT AND A METHOD FOR CONNECTING A PRINTED CIRCUIT BOARD OF AN INDICATING INSTRUMENT TO A CONNECTING CABLE HAVING INDIVIDUAL CORES

(75) Inventor: Thomas Erben, Eichberg (CH)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/778,024

(22) Filed: Feb. 5, 2001

(65) Prior Publication Data

US 2001/0024362 A1 Sep. 27, 2001

(30) Foreign Application Priority Data

Feb. 9, 2000 (DE) .......................... 100 05 978

(51) Int. Cl.⁷ .................................. H05K 5/06
(52) U.S. Cl. ............... 174/52.2; 174/52.1; 174/59; 174/60
(58) Field of Search ............... 174/52.2, 52.4, 174/52.1, 59, 60; 257/787, 788

(56) References Cited

U.S. PATENT DOCUMENTS 3,805,218 A  *  4/1974  Voida .......................... 439/610

FOREIGN PATENT DOCUMENTS

| DE | 1925781  | 11/1970 |
|----|----------|---------|
| DE | 3148706  | 7/1983  |
| DE | 8907575  | 9/1989  |
| DE | 4431026  | 3/1995  |
| DE | 19721101 | 12/1997 |
| DE | 19715674 | 10/1998 |

OTHER PUBLICATIONS

"Spezialisten Unter Druck", mpa–3, 1999, pp. 44–46.

* cited by examiner

Primary Examiner—Hung V. Ngo
(74) Attorney, Agent, or Firm—Martin A. Farber

(57) ABSTRACT

An indicating instrument has contact pins (6, 7, 8) which project into an encapsulation chamber (9). Within this encapsulation chamber (9), the contact pins (6, 7, 8) are connected by welding to individual cores (10, 11, 12) of a connecting cable (13). The weld points are then covered by encapsulation compound in the encapsulation chamber (9).

5 Claims, 1 Drawing Sheet

INDICATING INSTRUMENT AND A METHOD FOR CONNECTING A PRINTED CIRCUIT BOARD OF AN INDICATING INSTRUMENT TO A CONNECTING CABLE HAVING INDIVIDUAL CORES

FIELD AND BACKGROUND OF THE INVENTION

The invention relates to an indicating instrument which is intended in particular for a vehicle and has a housing with a connection having contact pins for a connecting cable comprising a number of individual cores. The invention furthermore relates to a method for connecting a printed circuit board of an indicating instrument, in particular in a vehicle, to a connecting cable having individual cores, in which method the individual cores are each connected to a contact pin of the indicating instrument.

Indicating instruments of the abovementioned type are provided in the dashboard of modern motor vehicles and watercraft, for example, and are therefore generally known. In motor vehicles, and to an even greater extent in ships, there is a risk with such indicating instruments that moisture can penetrate into the interior of the indicating instrument in the area of the connection. The contact pins must therefore be passed through the indicating instrument housing such that they are sealed, which is often done by positioning the contact pins in the mold during production of the housing using the injection-molding method, so that the contact pins are encapsulated in the plastic of the housing. A disadvantage in this case is that, in a situation such as this, the printed circuit board must be connected to the contact pins inside the housing, which is difficult for space reasons.

SUMMARY OF THE INVENTION

The invention is based on the objection of providing an indicating instrument of the type mentioned initially such that the connecting cable can be connected to the printed circuit boards using simple means and without any risk of leaks occurring. Furthermore, the invention has the objective of providing a method for connecting a printed circuit board of an indicating instrument to a connecting cable having individual cores, in which method the individual cores can be connected in as simple a manner as possible to a respective contact pin of the indicating instrument.

The first-mentioned objective is provided according to the invention in that the contact pins are connected within an encapsulation chamber by welding to the individual cores, and the weld points are covered by encapsulation compound in the encapsulation chamber.

Such an encapsulation chamber allows the contact pins to be connected to the printed circuit board outside the indicating instrument housing, and the contact pins then to be pushed from the inside to the outside, with play, through housing openings into the encapsulation chamber when the printed circuit board is being fitted, since the encapsulation compound which is finally introduced reliably prevents leaks through the housing openings. In addition, the encapsulation compound has the function of strain relief and protects the weld points against oxidation resulting from contact with air.

If the connecting cable is a continuous line, for example a bus line, then it is possible in accordance with an advantageous development of the invention to provide that the individual cores have a U-shaped connection region which runs in a curve into the encapsulation chamber, and the base of each connection region is welded to a respective contact pin. Such U-shaped connection regions allow the respective weld point to be moved sufficiently deep into the encapsulation chamber that it is reliably covered by the encapsulation compound.

Even relatively high forces, which act on the connection between the individual cores and the contact pins as a result of the indicating instrument being pulled transversely with respect to the direction of the bus line, do not lead to this connection becoming disconnected, if the contact pins are aligned as flat tabs transversely with respect to the individual cores and each have an aperture which is aligned transversely with respect to the main direction in which the individual cores extend and grips over the base of the U-shaped connection region of each individual core.

The risk of individual wires within the individual cores, which are normally in the form of braids, being cut through during welding, instead of the braid being welded as an entity to the respective contact pin can be overcome, according to another development of the invention, in that, on the front face of their respective aperture, the contact pins have a weld projection which projects into the aperture opening and is at least partially fused for welding of the individual cores.

The consumption of encapsulation compound is relatively low and there are no difficulties involved in filling the encapsulation chamber with it if the encapsulation chamber is provided on the rear face of the housing of the indicating instrument and is in the form of a box whose cross section is smaller than the cross section of the indicating instrument and which is open toward the rear face of the housing.

The second-mentioned objective problem, namely the provision of a method for connecting a printed circuit board to an indicating instrument with the connecting cable having individual cores, in which method the individual cores are each connected to a contact pin of the indicating instrument, is provided according to the invention in that the contact pins are first soldered to the printed circuit board and are passed through the housing of the indicating instrument into an encapsulation chamber which is formed on the outside of the housing, in that the individual cores of the connecting cable are then each connected by welding to a contact pin, and in that an encapsulation compound is then introduced into the encapsulation chamber.

Using this method, a sealed connection in the region of the cable connection can be produced with relatively little effort. At the same time, the encapsulation compound means that forces that need to be transmitted between the connecting cable and the housing do not need to be borne exclusively by the weld points, since the encapsulation compound is able to bear a portion of such forces. In addition, the encapsulation compound protects the weld points against contact with air, and thus against corrosion.

The weld points extend for a relatively long distance into the encapsulation chamber so that they are reliably surrounded by the encapsulation compound if a U-shaped connection region is produced on the individual cores, by bending, for welding to the respective contact pin, and the base of each U-shaped connection region is connected to a respective contact pin.

The connection of the individual cores to the respective contact tab is particularly firm if, according to another development of the method according to the invention, flat contact pins are used having a respective aperture which grips over the base of each U-shaped connection region, and if material of the contact pin is fused by means of a laser beam for welding.

Inadvertently cutting through individual wires of the braids which form the individual cores during welding of the individual cores to the contact pins can reliably be prevented if a weld projection which projects into the opening of the aperture is provided on the opening side of each aperture, and this weld projection is at least partially fused for welding by means of the laser beam. Since the welding is carried out by means of a laser beam, there are no space problems for welding electrodes in the region of the encapsulation chamber. Furthermore, it is then reliably possible to ensure that no undesirably large amount of heat enters the interior of the housing of the indicating instrument via the contact pins.

BRIEF DESCRIPTION OF THE DRAWING

The invention allows various embodiments. In order to illustrate its fundamental principle further, one of these is described in the following text and is illustrated in the drawing, in which.

DETAILED DESCRIPTION OF THE PREFERRED EMBODIMENT

Figure 1:
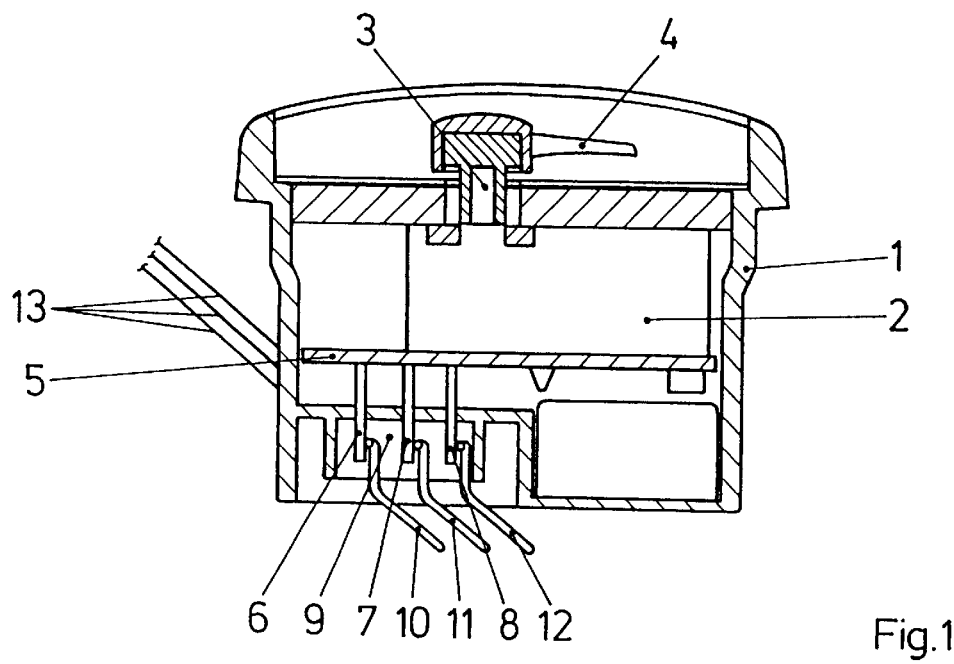
FIG. 1 shows a longitudinal section through an indicating instrument according to the invention.

The indicating instrument which is illustrated as an entity in FIG. 1 has a housing 1 in which an instrument mechanism 2 is arranged, which drives a pointer 4 via a pointer shaft 3. A printed circuit board 5 is arranged behind the instrument mechanism 2, and contact pins 6, 7, 8 pass from this printed circuit board through the housing 1 into an encapsulation chamber 9. There, these contact pins 6, 7, 8 are connected by laser welding to individual cores 10, 11, 12 of a connecting cable 13 which is in the form of a continuous line, in particular a bus line.

Figure 2:
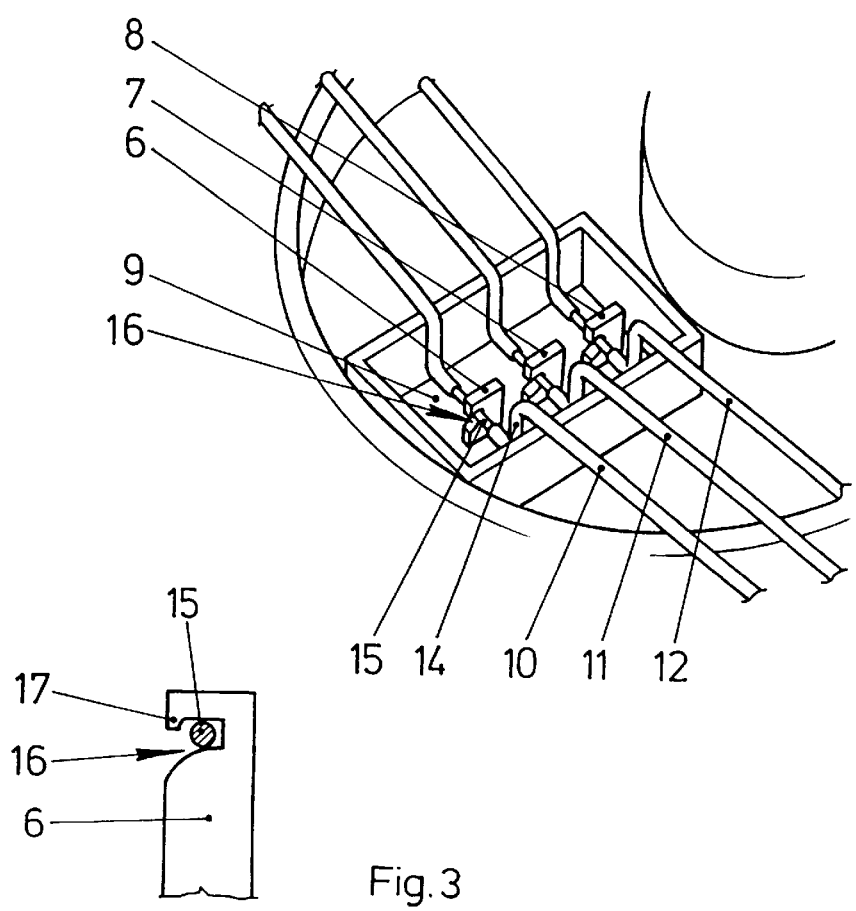
FIG. 2 shows a perspective plan view of a subregion of the rear face of the indicating instrument.

It can be seen from FIG. 2 that the individual cores 10, 11, 12 each have a U-shaped connection region 14, with a base 15, within the encapsulation chamber 9, via which base 15 the respective contact pin 6, 7, 8 engages with an aperture 16 in the respective contact pin 6, 7, 8.

Figure 3:
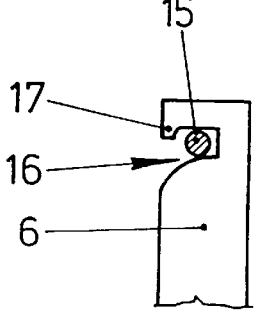
FIG. 3 shows a view of an upper region of a contact pin of the indicating instrument.

FIG. 3 shows that the aperture 16 has a weld projection 17, projecting into the aperture opening, on the upper face of its aperture opening. When the base 15 is being welded to the contact pin 6, the laser beam is directed at this weld projection 17 so that the latter at least partially fuses and the melt flows over the base 15, reliably welding it to the contact pin 6.

I claim:

1. An indicating instrument in particular for a vehicle comprising a housing in which a printed circuit board is arranged, which printed circuit board having contact pins of a connection for a connecting cable comprising a number of individual cores, wherein the contact pins (6, 7, 8) pass from said printed circuit board (5) through the housing (1) into an encapsulation chamber (9) and are connected within the encapsulation chamber (9) by welding to the individual cores (10, 11, 12), and weld points are covered by encapsulation compound in the encapsulation chamber (9).

2. An indicating instrument in particular for a vehicle comprising a housing with a connection having contact pins for a connecting cable comprising a number of individual cores, wherein the contact pins (6, 7, 8) are connected within an encapsulation chamber (9) by welding to the individual cores (10, 11, 12), and weld points are covered by encapsulation compound in the encapsulation chamber (9), wherein the connecting cable is a continuous line, wherein the individual cores (10, 11, 12) have a U-shaped connection region (14) which runs in a curve into the encapsulation chamber (9), and a base (15) of each connection region (14) is welded to a respective of said contact pins (6, 7, 8).

3. The indicating instrument as claimed in claim 2, wherein the contact pins (6, 7, 8) are aligned as flat tabs transversely with respect to the individual cores (10, 11, 12) and each have an aperture (16), which is aligned transversely with respect to a main direction in which the individual cores (10, 11, 12) extend, and grips over the base (15) of the U-shaped connection region (14) of each of said individual cores (10, 11, 12).

4. The indicating instrument as claimed in claim 3, wherein on a front face of their respective aperture (16) the contact pins (6, 7, 8) have a weld projection (17) which projects into an opening of the aperture and is at least partially fused for welding of the individual cores (10, 11, 12).

5. An indicating instrument in particular for a vehicle comprising a housing with a connection having contact pins for a connecting cable comprising a number of individual cores, wherein the contact pins (6, 7, 8) are connected within an encapsulation chamber (9) by welding to the individual cores (10, 11, 12), and weld points are covered by encapsulation compound in the encapsulation chamber (9), wherein the encapsulation chamber is provided on a rear face of the housing (1) of the indicating instrument, and is in the form of a box whose cross section is smaller than the cross section of the indicating instrument and which is open toward the rear face of the housing (1).

* * * * *